Sept. 3, 1957  J. J. HUPERT ET AL  2,805,336
SPECTRUM GENERATOR

Filed July 22, 1955  3 Sheets-Sheet 2

INVENTORS:
Julius J. Hupert
and Joseph S. Naber
Marshall A. Burmeister
Atty.

Sept. 3, 1957 J. J. HUPERT ET AL 2,805,336
SPECTRUM GENERATOR
Filed July 22, 1955 3 Sheets-Sheet 3
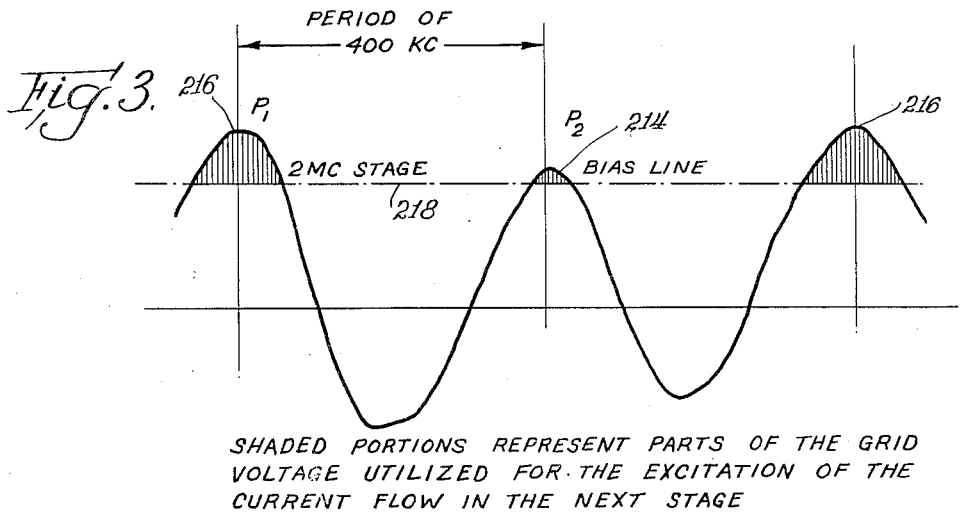
SHADED PORTIONS REPRESENT PARTS OF THE GRID VOLTAGE UTILIZED FOR THE EXCITATION OF THE CURRENT FLOW IN THE NEXT STAGE
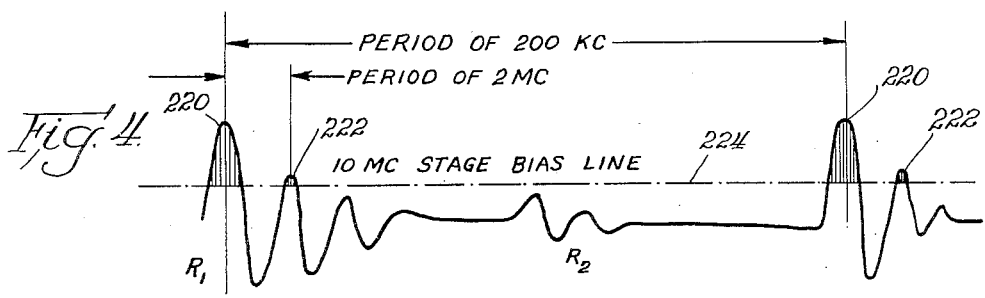
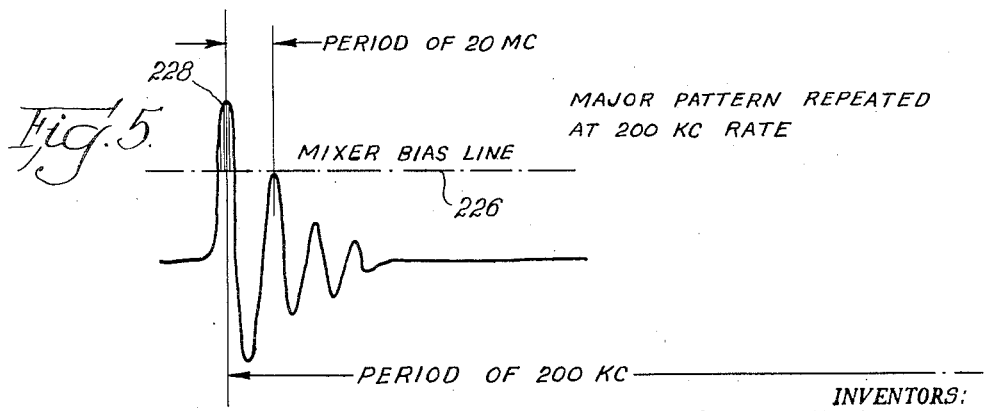
INVENTORS:
Julius J. Hupert
and Joseph S. Naber
By Marshall A. Burmeister
Atty.

United States Patent Office 2,805,336
Patented Sept. 3, 1957

2,805,336

SPECTRUM GENERATOR

Julius J. Hupert, Glen Ellyn, and Joseph S. Naber, Wheeling, Ill., assignors to A. R. F. Products, Inc., River Forest, Ill., a corporation of Illinois Application July 22, 1955, Serial No. 523,638

12 Claims. (Cl. 250—36)

The present invention relates to electrical signal generators and in particular to signal generators for producing equally spaced signals throughout a region of the electromagnetic spectrum.

It is often desirable to calibrate a variable frequency oscillator. The oscillator may be successively beat against a number of the signals produced by a spectrum generator and the position of the frequency varying means noted. Since the frequency of the oscillator is usually known to be within a frequency range and the frequency of each of the spectral signals is known to be integrally related to the lowest frequency signal produced by the signal generator, each of the beats occurs at a known frequency.

Spectrum generators may produce a single pulse containing frequency components extending up to the high frequency end of the spectrum under consideration, or a spectrum generator may produce a plurality of integrally related signals of different frequency.

It is necessary that the spectral signals extend to the upper frequency limit of the variable oscillator in order to employ this method of frequency calibration. As an example, it is conventional to employ 200 kilocycle oscillators to generate spectral signals extending up to approximately 20 megacycles. However, if it is desired to generate spectral signals spaced by the same frequency interval to a much higher frequency, for example 400 megacycles, a simple oscillator can not be employed. It is thus an object of the present invention to provide a spectrum generating device which will produce spectral signals separated by narrow intervals throughout a larger range of the electromagnetic spectrum.

In general, the interval between adjacent spectral signals need not be as small for higher portions of a spectrum than for lower portions of the spectrum. Further, it is sometimes difficult to identify the frequency of a given spectrum signal if the spectral signals are at close intervals. It is therefore a further object of the present invention to provide a spectrum generator which will generate spectral signals covering a wide frequency spectrum having means for selecting the interval between adjacent spectral signals.

The inventors achieve the above objects by generating pulses in a tuned circuit having a resonant frequency somewhere in the spectrum to be generated above the lowest frequency spectral signal to be generated. The frequency of resonance of the tuned circuit is chosen to produce a pulse which contains a sufficient spectral distribution to reach the upper end of the spectrum which is to be generated. The tank circuit is connected in a class C stage, and the stage is driven by pulses having the desired repetition rate to produce the proper interval between adjacent spectral signals. The driving pulses for the class C stage containing the resonant circuit must themselves be relatively short, and these pulses may readily be generated by driving the driving stage for the class C amplifier with pulses which are produced in resonant tank circuits of lower frequency than the driving stage. By cascading a series of stages operating in this manner the ultimate spectral interval can be obtained from the lowest driving frequency. It is also necessary that each of the driving stages contain tank circuits with resonant frequencies which are integrally related in order to generate the harmonic of the pulse impressed upon a given stage from its driving stage.

When a pulse is impressed upon a resonant tank circuit which has a resonant frequency which is integrally related to the fundamental frequency of the pulses, so that the pulse contains a harmonic at the resonant frequency of the tank circuit, a damped wave train occurs having the frequency of resonance of the tank circuit. If this wave train is used further to drive a succeeding stage and the succeeding stage is biased to cut off all but the initial pulse of the wave train, it is clear that the pulse width from the succeeding stage will be short relative to 180 degrees in that stage. If in a spectrum generator constructed to carry out this method of operation, each of the driving stages is biased to respond only to the first pulse of the damped wave train of the preceding stage, the shape of the wave appearing at the output of the last stage will itself be a damped wave train of the same frequency as the frequency of resonance of the final class C stage. However, if the biases on some of the stages in the spectrum generator are not properly set so that each stage responds to a larger portion of the wave than the first pulse in the damped wave train, then a complex wave form will appear at the output of the last stage, and this complex wave will have a repetition rate equal to the frequency of the first driving stage in the spectrum generator.

As a result of the complex wave form appearing in the resonant circuit of the final stage of the spectrum generator, some of the spectral signals in restricted portions of the generated spectrum will tend to cancel, or partially cancel. This is undesirable, particularly if the output of the spectrum generator is to be impressed upon an oscilloscope. It is therefore a further object of the present invention to provide a spectrum generator which produces a spectrum by the method outlined above which avoids partial cancellation of spectral signals in restricted portions of the generated spectrum.

These and other objects of the present invention will be more readily understood from a further reading of the present disclosure, particularly when viewed in the light of the drawings, in which:

Figure 3 is a graph showing the relationship between time and the instantaneous value of the current appearing in the plate circuit of the 400 kilocycle stage of the spectrum generating device;

Figure 4 is a graph showing the relationship between time and the instantaneous value of the current appearing in the plate circuit of the 2 megacycle stage of the spectrum generating device; and Figure 5 is a graph showing the relationship between time and the instantaneous value of the current appearing in the plate circuit of the 20 megacycle stage of the spectrum generating device.

Figure 1:
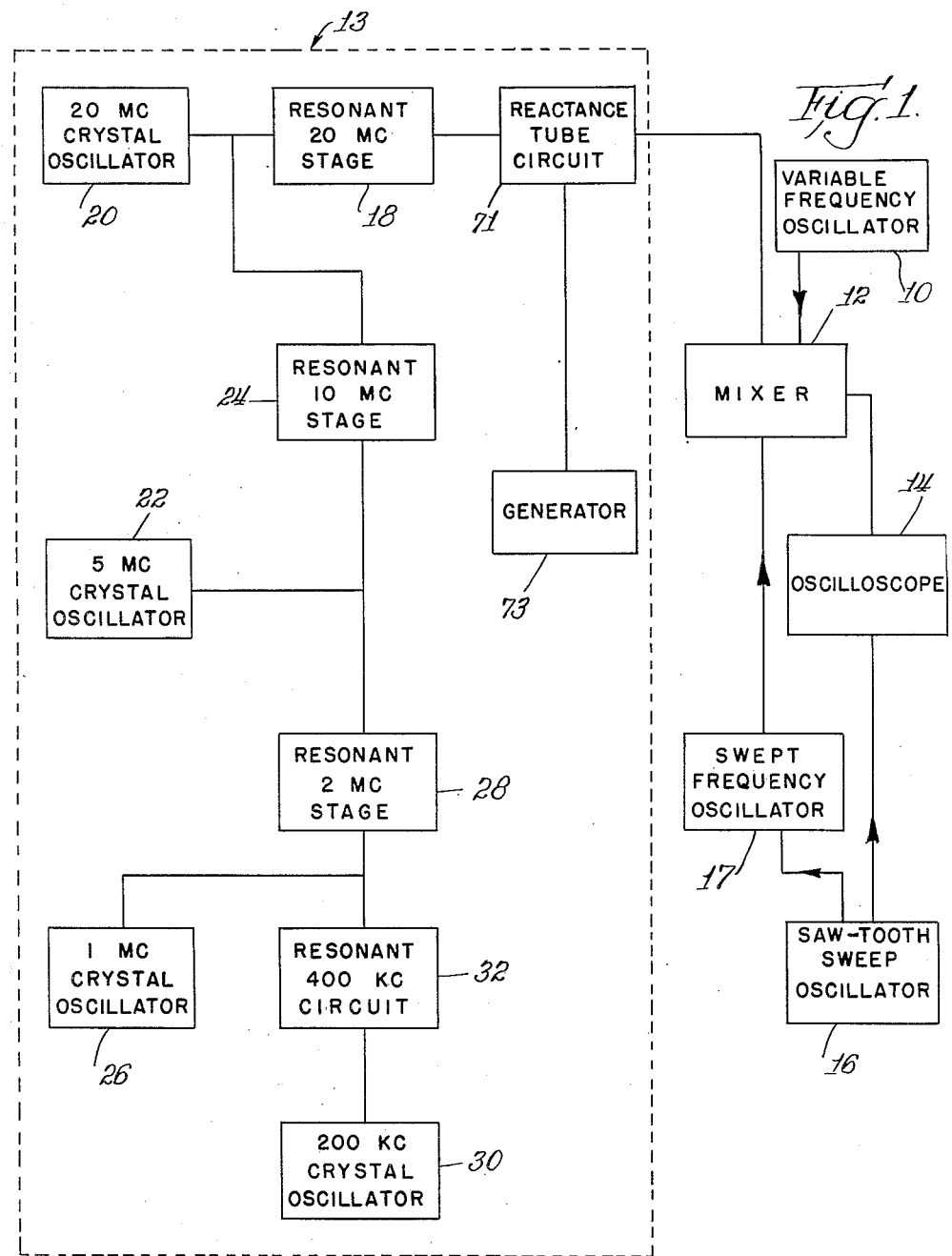
Figure 1 is a block diagram of a spectrum generating device constructed according to the teachings of the present invention.

As illustrated in Figure 1, a manually tuned variable frequency oscillator 10, which is to be calibrated by beating the output of the oscillator against a number of signals from a spectrum generating device, designated 13, is connected to the input of the mixer 12. The output of a spectrum generating device 13, constructed according to the teachings of the present invention, is also connected to the input of the mixer 12, and the output of the mixer 12 is connected to an indicating means, such as an audio reproducer which will indicate zero beat between the oscillator 10 and one of the spectral signals from the spectrum generating device 13, or an oscilloscope, designated 14, having a saw-tooth sweep oscillator 16 connected thereto. The saw-tooth oscillator 16 is also connected to a "swept frequency" oscillator 17 and frequency modulates the swept frequency oscillator 17 synchronously with the oscilloscope horizontal sweep. The swept frequency oscillator 17 is coupled to the mixer 12 in order to provide frequency markers on the oscilloscope 14.

The spectrum generator 13 has a 20 megacycle resonant stage 18 which generates the spectral signals and operates in all cases, and the resonant stage 18 is coupled to the input of the mixer 12. When the spectral lines are to be separated by a frequency of 20 megacycles, a 20 megacycle crystal oscillator 20 is energized, the oscillator 20 being coupled to the input of the 20 megacycles resonant stage 18. These are the only two stages of the spectrum generator 13 which are in operation under this particular set of conditions.

In the event that a 5 megacycle separation between spectral frequencies, or lines, is desired, the 20 megacycle crystal oscillator 20 is deactuated, and a 5 megacycle crystal oscillator 22 is energized. The 5 megacycle crystal oscillator 22 is coupled to the input of the 20 megacycle resonant stage 18 through a 10 megacycle stage 24, which is also energized. Under these conditions, the 5 megacycle crystal oscillator produces pulses in the form of damped wave trains in the output circuits of the 10 megacycle stage 24 and 20 megacycle stage 18, and these pulses have a repetition rate of 5 megacycles. In this manner, pulses having the shape of the 20 megacycle stage 18, and hence desired spectral distribution, are produced with a repetition rate of 5 megacycles.

In like manner, a 1 megacycle separation between spectral lines may be obtained by actuating a 1 megacycle crystal oscillator 26 and deactuating the 5 megacycle crystal oscillator 22 and 20 megacycle crystal oscillator 20. The 1 megacycle crystal oscillator 26 is coupled to the input of the resonant 10 megacycle stage 24 through a resonant 2 megacycle stage 28, which is also energized.

Also, a spectral line separation of 200 kilocycles may be obtained in the same manner by actuating a 200 kilocycle crystal oscillator 30 and a resonant 400 kilocycle circuit 32, and deactuating the crystal oscillators 20, 22 and 26.

Figure 2:
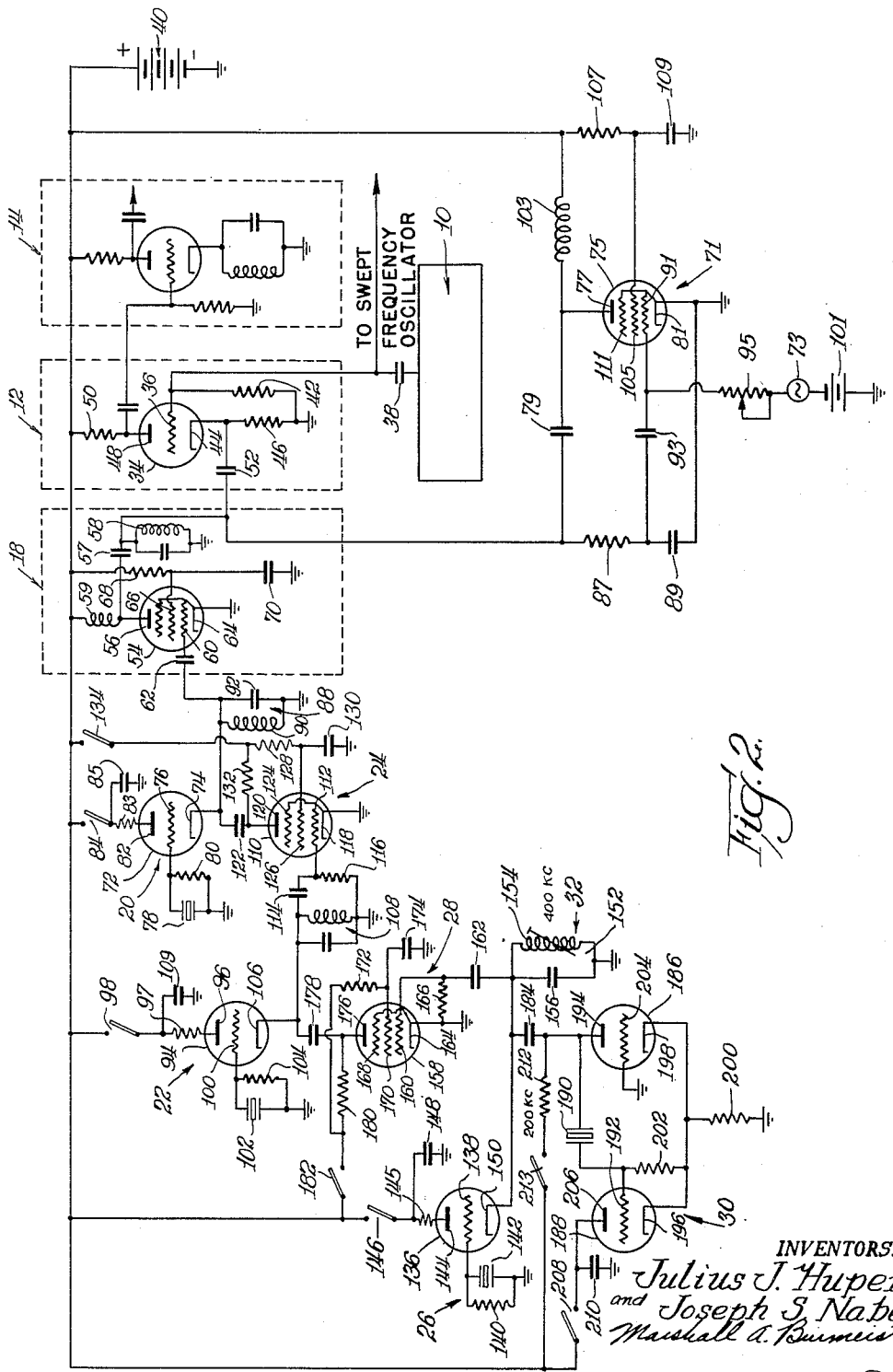
Figure 2 is a schematic electrical diagram of the spectrum generator, mixer, and indicating means illustrated in Figure 1.

The schematic electrical circuit diagram for the spectrum generator, mixer, and a portion of the oscilloscope appears in Figure 2. Since the oscilloscope 14 and sweep oscillator 16 are conventional, their circuits have not been shown. The mixer 12 utilizes a vacuum tube 34 in a conventional mixing circuit, the variable frequency oscillator 10 being connected to the control grid 36 of the vacuum 34 through a condenser 38. The control grid 36 is connected to the negative terminal of a suitable power source, such as battery 40, through a resistor 42. The cathode 44, or return electrode, of vacuum tube 34 is also connected to the negative terminal of power source 40 through a resistor 46. The plate 48 of vacuum tube 34 is connected to the positive terminal of the power source 40 through a plate resistor 50. The output signal from the resonant 20 megacycle stage 18 is connected to the cathode 44 of vacuum tube 34 through a condenser 52.

The 20 megacycle resonant stage 18 is a class C amplifier and has a vacuum tube 54 with a plate 56 connected to a parallel resonant tank circuit 58 through a coupling condenser 57 and to the positive terminal of the power source 40 through a radio frequency choke 59. The other end of the tank circuit 58 is connected to the negative terminal of the power source 40. Vacuum tube 54 also has a control grid 60 which is coupled to the 20 megacycle crystal oscillator 20 and to the resonant 10 megacycle stage 24 through a coupling condenser 62. The cathode 64 of vacuum tube 54 is connected to the negative terminal of the power source 40, and the screen grid 66 of vacuum tube 54 is connected to the positive terminal of the power source 40 through a dropping resistor 68, the screen grid also being by-passed to the negative terminal of the power source 40 by condenser 70. The tank circuit 58 of the resonant 20 megacycle stage 18 is tuned to resonant at 20 megacycles.

The resonant frequency of the tank circuit 58 is periodically varied by a reactance tube circuit 71 connected in parallel with the tank circuit 58, and a sinusoidal oscillator 73, connected to the reactance tube circuit 71. The reactance tube circuit 71 has a vacuum tube 75 with a plate 77 connected to the plate end of the tank circuit 58 through a condenser 79. The cathode 81 of vacuum tube 75 is connected to the other end of the tank circuit 58, and a resistor 87 is connected in series with a condenser 89 and connected in parallel with the tank circuit 58. Vacuum tube 75 also has a control grid 91 which is connected to the junction of resistor 87 and condenser 89 through a condenser 93. The alternating current generator 73 is connected between the control grid 91 of vacuum tube 75 and the cathode 81 thereof in series with a resistor 95 and a negative grid bias supply, such as battery 101. A source of voltage, such as the battery 40, is connected between the cathode 81 and the plate 77 of vacuum tube 75, through a choke 103. Vacuum tube 75 also has a screen grid 105 which is connected to the positive terminal of battery 40 through a resistor 107 and to the negative terminal of battery 40 through a by-pass condenser 109. Vacuum tube 75 also has a suppressor grid 111 which is connected to a cathode 81 thereof.

The 20 megacycle crystal oscillator 20 uses a vacuum tube 72 with a cathode 74 which is coupled into the resonant 20 megacycle stage 18. The tube 72 has a control grid 76, and a crystal 78 having a resonant frequency of 20 megacycles is connected between the grid 76 and the negative terminal of the power source 40. The crystal 78 has connected in parallel therewith a resistor 80. The plate 82 of vacuum tube 72 is connected to the positive terminal of the power source through a resistor 83 and switch 84, and the plate 82 is also by-passed to the negative terminal of the power source by a condenser 85. The cathode 74 of the 20 megacycle crystal oscillator 20 is also connected to the negative terminal of the power source 40 through a tank circuit 88 which includes a coil 90 connected in parallel with the condenser 92. The tank circuit 88 is not tuned to the resonant frequency of the crystal 78, but to a frequency lower than the resonant frequency of the crystal 78. In the particular construction, the tank circuit 88 is tuned to a frequency of 10 megacycles, where the resonant frequency of the crystal 78 is 20 megacycles. Hence at the frequency of 20 megacycles, the tank circuit 88 merely presents, a reactance to the circuit.

The 5 megacycle crystal oscillator 22 is constructed in a manner similar to the 20 megacycle crystal oscillator 20. The 5 megacycle crystal oscillator 22 has a vacuum tube 94 with a plate 96 connected to the positive terminal of the power source 40 through a resistor 97 and switch 98. Vacuum tube 94 also has a grid 100 connected to the negative terminal of the power source 40 through a crystal 102 connected in parallel with a resistor 104, the crystal 102 having a resonant frequency of 5 megacycles. Vacuum tube 94 also has a cathode 106 connected to the negative terminal of the power cource through a tank circuit 108 having a resonant frequency below that of the resonant frequency of the crystal 102, in the particular construction the resonant frequency being 2 megacycles. The plate 96 of vacuum tube 94 is also by-passed to the negative terminal of the power source 40 by condenser 109.

The 5 megacycle signal produced by the 5 megacycle oscillator 22 is coupled to the input of the 20 megacycle resonant stage through the 10 megacycle resonant stage 24. The 10 megacycle resonant stage 24 has a vacuum tube 110 with a control grid 112 which is coupled to the cathod 106 of tube 94 of the 5 megacycle oscillator through a condenser 114. The grid is also connected to the negative terminal of the power source through a grid resistor 116. The cathode 118 of vacuum tube 110 is also connected to the negative terminal of the power source 40. The vacuum tube 110 has a plate 120 which is coupled through a coupling condenser 122 to the cathode 74 of vacuum tube 72. In addition, vacuum tube 110 has a screen grid 126 connected to the positive terminal of the power source 40 through a resistor 128 and to the negative terminal of the power source 40 through a by-pass condenser 130. The plate 120 of vacuum tube 110 is also connected to the positive terminal of the power source through a plate resistor 132 connected in series with a switch 134.

The 1 megacycle crystal oscillator 26 is also of similar construction to the 20 megacycle oscillator 20. It has a vacuum tube 136 with a grid 138 connected to the negative terminal of the power source 40 through parallel connected resistor 140 and crystal 142, the resonant frequency of the crystal 142 being 1 megacycle. Vacuum tube 136 also has a plate 144 which is connected to the positive terminal of the power source 40 through a resistor 145 and switch 146 and to the negative terminal of the power source 40 through a by-pass condenser 148. Vacuum tube 136 has a cathode, or return electrode 150, which is connected to a tank circuit 152 having a parallelly connected coil 154 and condenser 156, the opposite end of the tank circuit 152 being connected to the negative terminal of the power shource 40. The resonant frequency of the tank circuit 152 in the particular construction is 400 kilocycles, where the resonant frequency of the crystal 142 is 1 megacycle.

The 1 megacycle crystal oscillator 26 is coupled to the 10 megacycle resonant stage 24 through a 2 megacycle resonant stage 28. The 2 megacycle resonant stage 28 has a vacuum tube 158 with a control grid 160 coupled to the cathode 150 of vacuum tube 136 through a condenser 162. Vacuum tube 158 also has a cathode 164 connected to the negative terminal of the power source, and the grid 160 of vacuum tube 158 is also connected to the negative terminal of the power source through a grid resistor 166. Vacuum tube 158 also has a screen grid 170 connected to the positive terminal of the power source 40 through a resistor 172 and to the negative terminal of the power source through a condenser 174. Vacuum tube 158 is also provided with a plate 176 which is coupled to the cathode 106 of the 5 megacycle oscillator 22 through a coupling condenser 178, the plate 176 also being connected to the positive terminal of the power source 40 through a plate resistor 180 and a switch 182 connected in series. It is to be noted, that the tank circuit 108 serves both as an impedance for the 5 megacycle crystal oscillator and as a resonant tank circuit for the resonant 2 megacycle stage 28.

The 200 kilocycle oscillator 30 is coupled through condenser 184 to the cathode 150 of the 1 megacycle crystal oscillator 26. It utilizes two tubes 186 and 188 connected in an oscillator circuit, a 200 kilocycle crystal 190 being connected between the grid 192 of vacuum tube 188 and the plate 194 of vacuum tube 186. The cathodes 196 of vacuum tube 188 and 198 of vacuum tube 186 are interconnected and connected to the negative terminal of the power source 40 through a resistor 200. The grid 192 of vacuum tube 188 is also connected to the cathodes 196 and 198 through a resistor 202. The grid 204 of vacuum tube 186 is directly connected to the negative terminal of the power source. Vacuum tube 188 has a plate 206 which is connected to the positive terminal of the power source 40 through a switch 208, and the the plate 206 is connected to the negative terminal of the power source 40 through a by-pass condenser 210. The plate 194 of vacuum tube 186 is also connected to the positive terminal of the power source through resistor 212 and the switch 213 connected in series.

In order to produce a spectrum with a 20 megacycle separation between adjacent spectral signals, only switch 84 of the 20 megacycle crystal oscillator 20 is closed, the other switches 98, 134, 146, 182, 208 and 213 being open. A 5 megacycle separation between spectrum signals is obtained with switches 84, 146, 182, 208 and 213 open, and switches 98 and 134 close. A 1 megacycle separation between adjacent spectral signals is obtained by opening switches 84, 98, 208 and 214 and closing switches 146, 182 and 134. Finally, a spectrum with a 200 kilocycle separation between adjacent spectral signals is obtained with switches 208, 214, 182 and 134 closed, and switches 146, 98 and 84 open.

The operation of the spectrum generator is best illustrated wthen the switches are positioned as last indicated in order to produce a spectrum with a 200 kilocycle separation between adjacent spectral signals. Under these conditions the 200 kilocycle oscillator 30 is producing an essential sinusoidal wave having a frequency of 200 kilocycles per second and impressing this wave upon the 400 kilocycle tank circuit 32. The current flowing in the 400 kilocycle tank circuit 32 takes the form illustrated in Figure 3 of the drawings. It will be noted that alternate peaks of the wave, designated 214, are of smaller amplitude than the other peaks, these smaller peaks being derived from the second harmonic of the wave produced by the oscillator 30. The input circuit of the resonant 2 megacycle stage 28 is biased to respond only to the larger peaks, designated 216, appearing across the tank circuit 32, the negative bias level being indicated by the dashed line 218 in Figure 3 and being provided by the grid resistor 166 in the resonant 2 megacycle stage 28. As a result, the grid 160 of vacuum tube 158 in the 2 megacycle resonant stage 28 is driven by a pulse which is narrow compared with 180 degrees at the frequency of 400 kilocycles per second and has a repetition rate of 200 kilocycles per second.

The current appearing in the plate circuit of the 2 megacycle stage 28 is illustrated in Figure 4 of the drawings. It will be noted, that the larger pulses 216 which are impressed upon the input of the 2 megacycle resonant stage 28 produce a damped wave in the plate current of the 2 megacycle stage 28 with a resonant frequency equal to that of the tank circuit 108, namely 2 megacycles. It will also be noted, that the smaller pulses 214 which are impressed upon the grid 160 of the 2 megacycle stage 28 produce relatively small variations in the plate current of vacuum tube 158. It will also be noted that the initial pulse, designated 220, of each damped wave train appearing in the tank circuit 108 is of substantially higher amplitude than the following pulse 222; and further has a wave form which is narrow compared with 180 degrees at a frequency of 2 megacycles. The grid 112 of vacuum tube 110 of the resonant 10 megacycle stage 24 is negatively biased to exclude all but the initial pulse 220 of each wave train appearing in the tank circuit 108, the level of this bias being indicated by the dashed line 224 in Figure 4. In this manner, the initial pulse 220 produces a damped wave train having a resonant frequency of 10 megacycles in the tank circuit 88 of the 10 megacycle resonant stage 24. The grid 60 of the vacuum tube 54 of the 20 megacycle resonant stage 18 is also negatively biased to respond only to the initial pulse of the damped wave train appearing in the tank circuit 88, thus producing a wave in the form of a damped wave train having a frequency of 20 megacycles in the tank circuit 58 of the resonant 20 megacycle stage 18, this wave being illustrated in Figure 5. Again, the negative bias indicated by the dashed line 226 in Figure 5 is applied to the grid 36 of the mixer tube 34, so that only the initial pulse 228 of the damped wave train appearing in the tank circuit 58 effects the plate current of the mixer stage 12.

From the foregoing analysis, it is clear that a negative grid bias in any one of the resonant stages 18, 24, 28 and 32 which is not sufficiently negative will cause the stage to respond to both the initial pulse of the damped wave train and the succeeding pulse. Under these conditions, the pulse appearing in the tank circuit 58 and the 20 megacycle resonant stage will not take the form illustrated in Figure 5, but rather will be a complex wave. The spectral components of such a complex wave will produce cancellations in localized regions of the generated spectrum.

The inventors have found, however, that the deleterious effects of these cancellations can be substantially eliminated by varying the resonant frequency of the tank circuit 58, or one of the preceding amplifier stages 24 or 28, to shift the region of cancellation from a region of interest to a region of no interest. The effect of shifting the resonant frequency of tank circuit 58 is to vary the time interval between the initial pulse 228 of the damped wave train appearing therein and the succeeding pulse, since this interval is a function of the frequency of resonance of the tank circuit 58. The initial pulse 228, however, is essentially undisturbed. As a result, the region of cancellation of the spectral signals is shifted. The reactance tube circuit 71 connected in parallel with the tank circuit 58 accomplishes this function. The bias placed upon the grid 91 of the reactance tube 75 is varied in order to shift the regions of cancellation. The problem of partial cancellations is essentially eliminated, by impressing a sinusoidal bias voltage upon a grid 91 of the reactance tube 75. The signal generator 73 connected in the grid bias circuit accomplishes this purpose.

The foregoing disclosure is directed to a specific embodiment of the present invention. It is clearly within the skill of the art to devise modifications to the foregoing embodiment and other embodiments within the skill of the art. For example, many conventional means of frequency modulation may be employed to vary the resonant frequency of the tank circuit of the resonant output stage of the spectrum generator, such as a motor driven variable condenser. It is therefore intended that the scope of the present invention be not limited by the foregoing disclosure, but rather only by the appended claims.

The invention claimed is:

1. An electrical device comprising an oscillator having a resonant frequency, a first non-oscillating harmonic selector having an input circuit coupled to the oscillator and a resonant output circuit having a frequency of resonance an integral multiple above the resonant frequency of the oscillator in which a damped wave train is produced, and a second non-oscillating harmonic selector having an input circuit coupled to the output circuit of the first harmonic selector and a resonant output circuit having a frequency of resonance an integral multiple above the frequency of resonance of the output circuit of the first harmonic selector, said second harmonic selector including means for rejecting a portion of each wave train impressed thereon to form a hiatus between successive wave trains.

2. An electrical device comprising an oscillator having a resonant frequency, a first non-oscillating harmonic selector having an input circuit coupled to the oscillator and a resonant output circuit having a frequency of resonance an integral multiple above the resonant frequency of the oscillator in which a damped wave train is produced, a second non-oscillating harmonic selector having an input circuit coupled to the output circuit of the first harmonic selector and a resonant output circuit having a frequency of resonance an integral multiple above the frequency of resonance of the output circuit of the first harmonic selector, said second harmonic selector including means for rejecting a portion of each wave train impressed thereon to form a hiatus between successive wave trains, and means to vary the resonant frequency of the output circuit of the second harmonic selector.

3. An electrical device comprising an oscillator having a resonant frequency, a first non-oscillating harmonic selector having an input circuit coupled to the oscillator and a resonant output circuit having a frequency of resonance an integral multiple above the resonant frequency of the oscillator in which a damped wave train is produced, a second non-oscillating harmonic selector having an input circuit coupled to the output circuit of the first harmonic selector and a resonant output circuit having a frequency of resonance an integral multiple above the frequency of resonance of the output circuit of the first harmonic selector, said second harmonic selector including means for rejecting pulses with amplitudes no greater than a threshold value, and a reactance tube circuit connected in parallel with the resonant output circuit of the second harmonic selector.

4. An electrical device comprising an oscillator having a resonant frequency, a first non-oscillating harmonic selector having an input circuit coupled to the oscillator and a resonant output circuit having a frequency of resonance an integral multiple above the resonant frequency of the oscillator in which a damped wave train is produced, a second non-oscillating harmonic selector having an input circuit coupled to the output circuit of the first harmonic selector and a resonant output circuit having a frequency of resonance an integral multiple above the frequency of resonance of the output circuit of the first harmonic selector, said second harmonic selector including means for rejecting pulses with amplitudes no greater than the second pulse of the damped wave train in the output circuit of the first harmonic selector, a reactance tube circuit connected in parallel with the resonant output circuit of the second harmonic selector, and an alternating current source of voltage connected to the reactance tube circuit to periodically vary the resonant frequency of the output circuit of the second harmonic selector.

5. An electrical device comprising an oscillator having a fixed resonant frequency, a first non-oscillating class C stage having a vacuum tube, said stage having an input circuit connected between the grid and return electrode of said vacuum tube coupled to the oscillator and an output circuit connected between the plate and return electrode of said vacuum tube, including a tank circuit having a resonant frequency which is an integral multiple above the resonant frequency of the oscillator in which a damped wave train is produced, and a second class C stage having a vacuum tube, said stage having an input circuit connected between the grid and return electrode of the vacuum tube in said second class C stage, said input circuit being coupled to the output circuit of the first class C stage, said second class C stage having an output circuit having a tank circuit with a frequency of resonance which is an integral multiple of the resonant frequency of the tank circuit in the first stage, and said second class C stage including means to negatively bias the grid of the vacuum tube to reject pulses with amplitudes no greater than the second pulse of the damped wave train in the output circuit of the first harmonic selector.

6. An electrical device comprising an oscillator having a fixed resonant frequency, a first non-oscillating class C stage having a vacuum tube, said stage having an input circuit connected between the grid and return electrode of said vacuum tube coupled to the oscillator and an output circuit connected between the plate and return electrode of said vacuum tube including a tank circuit having a resonant frequency which is an integral multiple above the resonant frequency of the oscillator in which a damped wave train is produced, a second class C stage having a vacuum tube, said stage having an input circuit connected between the grid and return electrode of the vacuum tube in said second class C stage, said input circuit being coupled to the output circuit of the first class C stage, said second class C stage having an output circuit having a tank circuit with a frequency of resonance which is an integral multiple of the resonant frequency of the tank circuit in the first stage, and said second class C stage including means to negatively bias the grid of the vacuum tube to reject pulses with amplitudes no greater than the second pulse of the damped wave train in the output circuit of the first harmonic selector, and means to vary the resonant frequency of the tank circuit in the output circuit of the second class C stage.

7. An electrical device comprising an oscillator having a fixed resonant frequency, a first non-oscillating class C stage having a vacuum tube, said stage having an input circuit connected between the grid and return electrode of said vacuum tube coupled to the oscillator and an output circuit connected between the plate and return electrode of said vacuum tube including a tank circuit having a resonant frequency which is an integral multiple above the resonant frequency of the oscillator in which a damped wave train is produced, and a second class C stage having a vacuum tube, said stage having an input circuit connected between the grid and return electrode of the vacuum tube in said second class C stage, said input circuit being coupled to the output circuit of the first class C stage, said second class C stage having an output circuit having a tank circuit including a variable condenser and coil with a frequency of resonance which is an integral multiple of the resonant frequency of the tank circuit in the first stage, and said second class C stage including means to negatively bias the grid of the vacuum tube to reject pulses with amplitudes no greater than the second pulse of the damped wave train in the output circuit of the first harmonic selector.

8. An electrical device comprising an oscillator having a fixed resonant frequency, a first non-oscillating class C stage having a vacuum tube, said stage having an input circuit connected between the grid and return electrode of said vacuum tube coupled to the oscillator and an output circuit connected between the plate and return electrode of said vacuum tube, including a tank circuit having a resonant frequency which is an integral multiple above the resonant frequency of the oscillator in which a damped wave train is produced, a second class C stage having a vacuum tube, said stage having an input circuit connected between the grid and return electrode of the vacuum tube in said second class C stage, said input circuit being coupled to the output circuit of the first class C stage, said second class C stage having an output circuit having a tank circuit with a frequency of resonance which is an integral multiple of the resonant frequency of the tank circuit in the first stage, and said second class C stage including means to negatively bias the grid of the vacuum tube to reject pulses with amplitudes no greater than the second pulse of the damped wave train in the output circuit of the first harmonic selector, and a reactance tube circuit connected in parallel with the tank circuit of the second class C stage.

9. An electrical device comprising an oscillator having a fixed resonant frequency, a first non-oscillating class C stage having a vacuum tube, said stage having an input circuit connected between the grid and return electrode of said vacuum tube coupled to the oscillator and an output circuit connected between the plate and return electrode of said vacuum tube, including a tank circuit having a resonant frequency which is an integral multiple above the resonant frequency of the oscillator in which a damped wave train is produced, a second class C stage having a vacuum tube, said stage having an input circuit connected between the grid and return electrode of the vacuum tube in said second class C stage, said input circuit being coupled to the output circuit of the first class C stage, said second class C stage having an output circuit having a tank circuit with a frequency of resonance which is an integral multiple of the resonant frequency of the tank circuit in the first stage, and said second class C stage including means to negatively bias the grid of the vacuum tube to reject pulses with amplitudes no greater than the second pulse of the damped wave train in the output circuit of the first harmonic selector, a reactance tube circuit connected in parallel with the tank circuit of the second class C stage, and an alternating current generator connected to the reactance tube circuit to periodically vary the resonant frequency of the tank circuit in the second class C stage.

10. An electrical device comprising an oscillator having a resonant frequency, a first non-oscillating harmonic selector having an input circuit coupled to the oscillator and a resonant output circuit having a frequency of resonance an integral multiple above the resonant frequency of the oscillator in which a damped wave train is produced, a second non-oscillating harmonic selector having an input circuit coupled to the output circuit of the first harmonic selector and a resonant output circuit having a frequency of resonance an integral multiple above the frequency of resonance of the output circuit of the first harmonic selector, said second harmonic selector including means for rejecting pulses with amplitudes no greater than the second pulse of the damped wave train in the output circuit of the first harmonic selector, and a third class C stage having a vacuum tube including an input circuit connected between the grid and return electrode of the tube coupled to the output circuit of the second class C stage, said third class C stage being provided with negative biasing means connected to the grid thereof for rejecting pulses with amplitudes no greater than the second pulse in each wave train appearing in the output circuit of the second class C stage.

11. An electrical device comprising an oscillator having a fixed resonant frequency, a first non-oscillating class C stage having a vacuum tube, said stage having an input circuit connected between the grid and return electrode of said vacuum tube coupled to the oscillator and an output circuit connected between the plate and return electrode of said vacuum tube, including a tank circuit having a resonant frequency which is an integral multiple above the resonant frequency of the oscillator in which a damped wave train is produced, a second class C stage having a vacuum tube, said stage having an input circuit connected between the grid and return electrode of the vacuum tube in said second class C stage, said input circuit being coupled to the output circuit of the first class C stage, said second class C stage having an output circuit having a tank circuit with a frequency of resonance which is an integral multiple of the resonant frequency of the tank circuit in the first stage, and said second class C stage including means to negatively bias the grid of the vacuum tube to reject pulses with amplitudes no greater than the second pulse of the damped wave train in the output circuit of the first harmonic selector, a reactance tube circuit connected in parallel with the tank circuit of the second class C stage, an alternating current generator connected to the reactance tube circuit to periodically vary the frequency of the tank circuit in the second class C stage, and a third class C stage having a vacuum tube including an input circuit connected between the grid and return electrode of the tube coupled to the output circuit of the second class C stage, said third class C stage being provided with negative biasing means connected to the grid thereof for rejecting pulses with amplitudes no greater than the second pulse in each wave train appearing in the output circuit of the second class C stage.

12. An electrical device comprising an oscillator, a first non-oscillating harmonic selector having an input circuit coupled to the oscillator and a resonant output circuit having a frequency of resonance an integral multiple above the resonant frequency of the oscillator in which a damped wave train is produced, a second non-oscillating harmonic selector having an input circuit coupled to the output circuit of the first harmonic selector and a resonant output circuit, said second harmonic selector including means for rejecting a portion of each wave train impressed thereon to form a hiatus between successive wave trains, and means to sweep the resonant frequency of the output circuit of the second harmonic selector.

References Cited in the file of this patent

UNITED STATES PATENTS 2,498,809     Haner _____ Feb. 28, 1950